April 10, 1956 D. STEVENS ET AL 2,741,352
RELEASABLE TORQUE TRANSMITTING APPARATUS
Filed Oct. 16, 1950 4 Sheets-Sheet 2

INVENTORS.
DILLON STEVENS,
HENRY T. M. RICE,
ROBERT T. STEVENS,
BY
Bernard Kriegel
ATTORNEY.

April 10, 1956  D. STEVENS ET AL  2,741,352
RELEASABLE TORQUE TRANSMITTING APPARATUS
Filed Oct. 16, 1950  4 Sheets-Sheet 3

INVENTORS.
DILLON STEVENS,
HENRY T. M. RICE,
ROBERT T. STEVENS,
BY
Bernard Kriegel
ATTORNEY.

April 10, 1956 D. STEVENS ET AL 2,741,352
RELEASABLE TORQUE TRANSMITTING APPARATUS
Filed Oct. 16, 1950 4 Sheets-Sheet 4

INVENTORS.
DILLON STEVENS,
HENRY T. M. RICE,
ROBERT T. STEVENS,
BY
Bernard Kriegel
ATTORNEY.

United States Patent Office 2,741,352
Patented Apr. 10, 1956

2,741,352

RELEASABLE TORQUE TRANSMITTING APPARATUS

Dillon Stevens, Los Angeles, Henry T. M. Rice, San Marino, and Robert T. Stevens, Altadena, Calif.; said Rice and said Robert T. Stevens assignors to said Dillon Stevens Application October 16, 1950, Serial No. 190,344

31 Claims. (Cl. 192—56)

The present invention relates to torque transmitting devices, and more particularly to devices of that type which are automatically uncoupled or unclutched upon being subjected to a torque exceeding a predetermined maximum value.

Automatically releasable clutch devices are known for interrupting the drive between the driving and driven members when the torque being transmitted becomes excessive. Such devices, however, are not accurate or consistent in releasing the drive when the torque exceeds a desired predetermined value. This is particularly true of devices that place reliance upon springs, or spring-like members, to provide the force resisting disengagement of the clutch elements. Ordinarily, as the torque transmitted increases, the spring becomes more highly stressed, its resisting force increasing to an indefinite amount before the clutch elements disengage. The many variable factors surrounding the force exerted by the spring at the point of clutch release, as well as the greater amount of friction between the clutch elements themselves, make it exceedingly difficult, and, as a practical matter, impossible to pre-set and predetermine the torque load at which the clutch elements will release. As a result, such forms of automatically releasable clutches are grossly inaccurate. Moreover, since they release under maximum load conditions, the friction forces between the clutch teeth are very high, causing excessive and rapid wear of the parts and requiring their replacement in short order.

In addition to the high frictional engagement between the clutch parts at the point of release, the clutch elements remain released only momentarily, intermittently engaging and releasing from each other as power application to the mechanism continues. This imposes a repeated hammering action of the driving clutch elements upon the driven clutch elements, and subjects the parts and the ultimately driven member itself to torques that far exceed the amount at which the clutch releases intermittently. Power application must be discontinued to prevent continuation of the hammering or impact blows on the parts.

Automatically releasable clutch devices are used in tools for rotating and tightening threaded fastening elements. The clutch is supposed to release when a predetermined maximum torque is imposed on the threaded fastening elements, to insure against their being too loose or too tight. For the reasons mentioned above, among others, such release does not often occur at the required torque value. As a result, the tool is incapable of performing its intended function in an effective manner, leaving the fastening elements in an undesirable condition of looseness or excessive tightness, which may subject the elements and the parts to which they are fastened to inordinately high stresses and strains, possibly effecting distortion of such parts. The hammering action incident to intermittent release and re-engagement of the clutch parts imposes particularly deleterious effects on the threaded fastening elements and the parts to which they are secured, which can only be minimized by stopping rotation of the prime mover, so long as the tool remains applied to the threaded fastening element. The need for stopping and restarting the prime mover, which is also required in shifting the tool from one threaded fastening element to another, reduces the production speed at which parts can be assembled, and necessarily increases production costs.

Accordingly, it is an object of the present invention to overcome the aforenoted difficulties and disadvantages inherent in the prior art releasable torque transmitting devices.

Another object of the invention is to provide torque transmitting apparatus which will automatically release with accuracy and consistency at the predetermined torque value for which the apparatus is designed or adjusted.

A further object of the invention is to reduce or minimize the friction between the disengageable elements of a torque releasing device, in order to maintain accurately the torque at which the elements disengage or release from each other, for the purpose of interrupting the transmission of power. Whatever frictional resistance exists presents itself over only an exceedingly short interval of relative travel of the disengageable elements in a drive releasing direction.

Yet another object of the invention is to provide releasable torque transmitting apparatus, in which the force holding the driving and driven elements in engagement is substantially instantaneously relieved or reduced to zero when a predetermined torque is exceeded, thereby facilitating release of the elements from each other and enabling such release to occur under substantially no-load conditions, all of which reduces wear on the relatively movable parts, increasing their useful life considerably and promoting accurate operation of the mechanism.

A further object of the invention is to provide torque transmitting apparatus which avoids use of springs and like instrumentalities in furnishing the resisting force that predetermines the torque at which the drive through the apparatus will be released.

Yet another object of the invention is to provide releasable torque transmitting devices, in which the resisting force holding the releasable driving elements in engagement remains substantially constant as the torque transmitted increases to the value at which the elements are to automatically discontinue the transmission of the load or torque.

A further object of the invention is to provide releasable torque transmitting apparatus in which the torque at which the drive through the apparatus will release is readily adjustable. Such adjustment can take place over a broad range of torque releasing values.

Yet a further object of the invention is to provide releasable torque transmitting apparatus which is capable of infinite and accurate adjustment, between limits, to predetermine the torque at which the drive through the apparatus will be released.

Another object of the invention is to provide releasable torque transmitting apparatus embodying driving and driven elements which are disengaged from each other upon being subjected to a predetermined torque, and which disengagement is positively maintained until the elements are purposely re-engaged with each other. In a more limited sense, since the apparatus embodies a clutch device, the latter is held or latched in released position after the clutch parts are disengaged as a result of a predetermined torque being transmitted through the apparatus.

A further object of the invention is to provide releasable torque transmitting apparatus in which the drive through the apparatus is discontinued, and remains disconnected, following the subjecting of the apparatus to a predetermined torque load, thereby obviating the need for discontinuing rotation of the prime mover supplying the driving effort.

Another object of the invention is to provide releasable torque transmitting apparatus embodying clutch elements that are positively latched out of engagement upon being released as a result of the imposition of a predetermined torque, in which the clutch elements are automatically re-engaged upon release of the latching device.

Another object of the invention is to provide a torque transmitting tool for operation upon the work, the tool embodying driving and driven elements that are automatically released from one another upon being subjected to a predetermined torque, and held or latched in such released condition, re-engagement of the elements occurring automatically as an incident of removing the tool from the work. Such re-engagement of the elements may occur under no-load conditions, despite continued operation of the prime mover supplying the driving effort.

Yet another object of the invention is to bring the driving and driven clutch, and other elements of a torque transmitting tool out of engagement with each other, and to effect their automatic re-engagement upon removing the tool from the work, the ultimate driven member of the tool remaining disconnected so that no motion is imparted to it until it is reconnected as a result of its subsequent application to the same or other work.

A further object of the invention is to provide a torque transmitting tool for operation upon threaded fastening elements, which is capable of tightening each threaded fastening element to a predetermined value, and which allows the prime mover applying the driving effort to continue rotation during the shifting of the tool from one threaded fastening element to another, without impeding the application of the tool to the threaded fastening elements or its placement in proper engagement with such elements.

Another object of the invention is to provide a torque transmitting device that is capable of releasing the load at a predetermined torque value for both directions of rotation of the device.

This invention possesses many other advantages, and has other objects which may be made more clearly apparent from a consideration of several forms in which it may be embodied. These forms are shown in the drawings accompanying and forming part of the present specification. They will now be described in detail, for the purpose of illustrating the general principles of the invention; but it is to be understood that such detailed description is not to be taken in a limiting sense, since the scope of the invention is best defined by the appended claims.

Referring to the drawings.

The apparatus illustrated in Figs. 1 to 14, inclusive, is particularly designed to rotate a spindle 10 having a suitable non-circular end 11 for application to threaded fastening elements (not shown), for the purpose of tightening such elements to a predetermined extent, after which the drive through the spindle is automatically discontinued. It is to be understood, however, that the apparatus is of more general application, in that it may be used as an overload release device discontinuing the drive, or application of turning effort, to other parts when the torque transmitted exceeds a predetermined maximum value.

Figure 1:
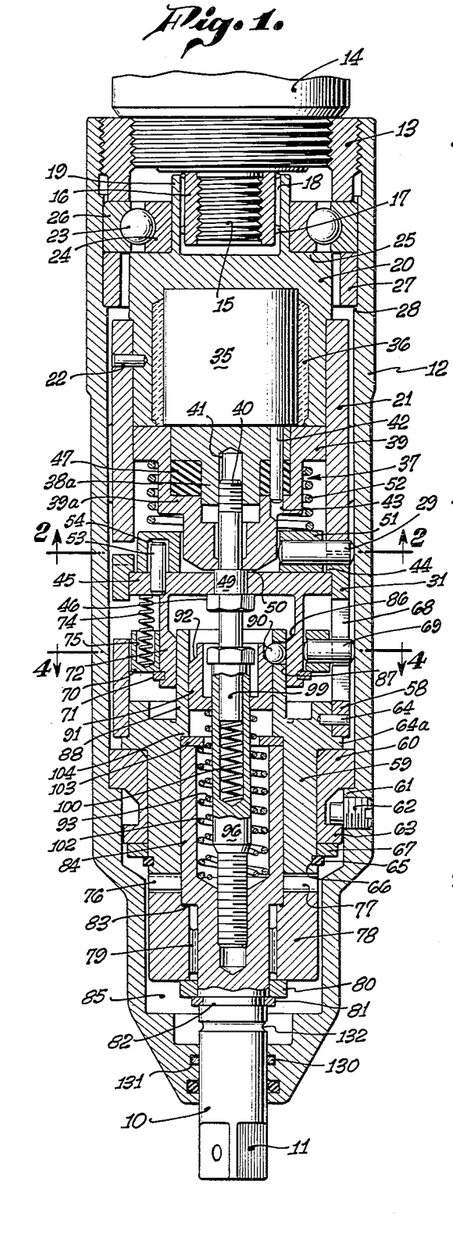
Figure 1 is a longitudinal section, parts being shown in elevation, through one form of apparatus embodying the invention, with the parts occupying one relative position.
Figure 2:
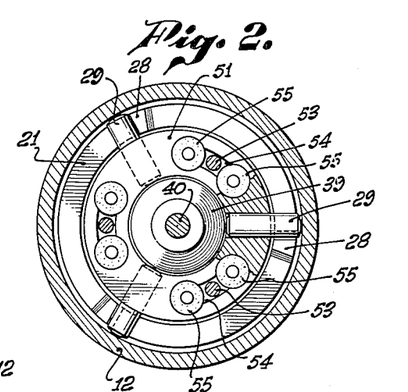
Fig. 2 is a cross-section taken along the line 2—2 on Fig. 1.

As disclosed in the drawings, the apparatus is contained within a suitable elongate casing 12 having an adapter ring 13 threaded into its upper end, by means of which the casing is firmly secured to the housing 14 of a prime mover, which may take the form of an electrical or air operated motor. The motor shaft 15 extends into the casing, being threadedly secured within a sleeve 16 having external splines 17 engaging internal splines 18 formed in an upwardly extending sleeve-like portion 19 of a magnet housing 20 of generally cup shape. This housing is rigidly secured to a driving sleeve or clutch member 21, as by providing a shrink fit between the two parts. If desired, the magnet housing 20 and driving clutch member 21 may also be secured together by a suitable interconnecting pin 22.

The magnet housing 20 is rotatably supported within the casing 12 through a suitable anti-friction radial and thrust bearing 23, which encompasses the housing extension 19, and whose inner race 24 engages the upper shoulder 25 of the housing. The outer race 26 of the bearing is clamped between the upper adapter ring 13 and a lower spacer sleeve 27 bearing upon a casing shoulder 28.

The driving clutch member 21 may make a close, sliding fit with the inner wall of the casing 12, to provide a supplemental bearing support. This member has a plurality of circumferentially spaced driving clutch teeth 28 engageable with anti-friction rollable elements 29 in the form of rollers, which are, in turn, engageable with driven clutch teeth 30 formed upon a driven clutch member 31. The driving teeth 28 may be formed as axial or face cams having tapered faces 32 engaging the rollers 29, and these latter elements may, in turn, engage companion tapered cam faces 33 on the driven teeth 30. From an inspection of Figs. 3, 12, 13, and 14, it is apparent that rotation of the driving clutch member 21 in the direction of the arrow 34 will cause corresponding rotation of the driven clutch member 31, but, in so doing, there will be a component of force tending to shift the driven clutch member 31 longitudinally and away from the driving clutch member, for the purpose of effecting disconnection between the clutch parts 28, 29, 30. Such tendency for the clutch parts to separate and become disconnected is resisted by a holding device that urges the driven clutch member 31 and the anti-friction rollers 29 toward the driving member 21, and maintains the parts in coupling relation. This holding device exerts a predetermined holding force upon the parts, which force remains constant, regardless of any variations or increases of the torque being transmitted through the clutch. When the torque transmitted overcomes the holding force, the latter is substantially instantly reduced to zero, enabling full release between the clutch parts to take place under substantially no-load conditions.

As shown in Figs. 1 to 14, inclusive, the holding force is provided by a magnet 35, which may be of the permanent magnet type, and which is coaxially secured within the cup-shaped magnet housing 20, as by the aid of a suitable solder or low melting point metal 36 forming a bond between the periphery of the magnet and the magnet housing. The lower surface of the permanent magnet 35 and of the magnet housing 20 may lie in a common plane to be engaged by an armature 37 having an adjustable central section 38. This section is movable axially within the outer body portion 39 of the armature by an armature gap adjusting screw 40, which is threaded into a companion bore 41 of the central section. This latter part is prevented from rotating with respect to the outer portion 39 of the armature by a holding pin 42 in the central section slidable within a suitable hole 43 in the outer armature portion. It is apparent that rotation of the screw 40 will either feed the central armature section 38 toward or away from the magnet 35, depending upon the direction that the screw is turned, thereby enabling the gap between the central section and the magnet to be adjusted, which correspondingly adjusts the holding force of the magnet and its housing 20 on the composite armature member 37.

The armature member 37 is pulled away from the magnet as a result of the downward components of force, proportional to the torque, being transmitted through the primary clutch device. Thus, the driven clutch member 31 has a downwardly facing shoulder 44 engaging an armature retracting member 45, the latter part rotating with the driven clutch member by virtue of a shrink fit between the parts. The downward force on the armature retracting member is transmitted to the armature 37 by engagement of the former with a head 46 formed on the armature gap adjusting screw 40, the downward force on the latter member pulling the central section 38 downwardly, and also the outer armature section 39 downwardly through an elastic spring member 47 in the form of a rubber, or rubber-like, ring encompassing the hub 38a of the central section and bearing upon a shoulder 39a formed in the outer armature section. This rubber ring member 47 urges the adjustable armature section 38 in an upward direction, and enables it to adjust itself, so as to make proper surface engagement with the lower face of the magnet 35 when the maximum holding force on the armature is desired.

The outer body 39 of the armature rests upon a shoulder 48 provided by a cylindrical boss 49 extending upwardly from the head 46 of the gap adjusting screw and through the armature retracting member 45. This boss 49 is greater in length than the thickness of the armature retracting member 45 so as to provide a slight clearance gap 50 between the outer body 39 of the armature and the armature retracting member 45 that will allow the outer body portion of the armature to seat squarely against the magnet 35 and magnet housing 20 free from restraint by the armature retracting member.

The anti-friction radially mounted rollers 29 are rotatable within a cage or carrier 51 encompassing the outer armature body 39. This carrier is urged in a downward direction by a helical return spring 52 compressed between the outer flanged portion of the armature body 39 and the carrier 51. The carrier itself is rotatable with the driven clutch member 31 and the armature retracting member 45, but is movable angularly to a limited extent with respect to these parts to enable disengagement of the clutch to take place, and also to insure that the rollers 29 will remain out of engagement with the driving clutch teeth when the clutch is disengaged. Thus, the armature retracting member 45 has a plurality of pins 53 secured to it which extend upwardly into arcuate channels 54 formed in the roller carrier 51. At the opposite ends of each channel, the carrier is provided with elastic members 55, in the form of rubber cylindrical positioning members, that are engaged by each pin 53 and which will yield or deform, to allow relative rotation between the armature retracting member 45 and cage 51 to a limited extent for both directions of rotation of the latter and of the driven clutch member 31 attached thereto, for a purpose described below.

Figure 3:
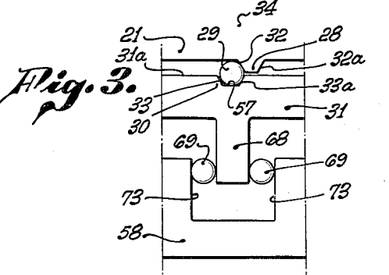
Fig. 3 is a fragmentary side elevation of the primary clutch and spline connection embodied in the apparatus.
Figure 4:
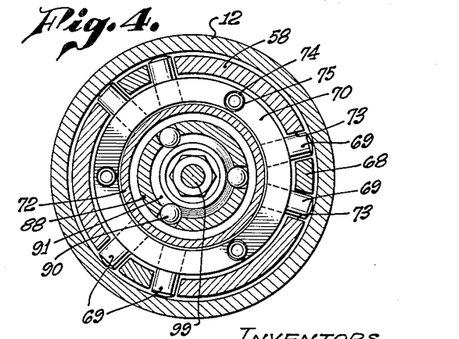
Fig. 4 is a cross-section taken along the line 4—4 on Fig. 1.
Figures 9, 10, 11, 12, 13, 14:
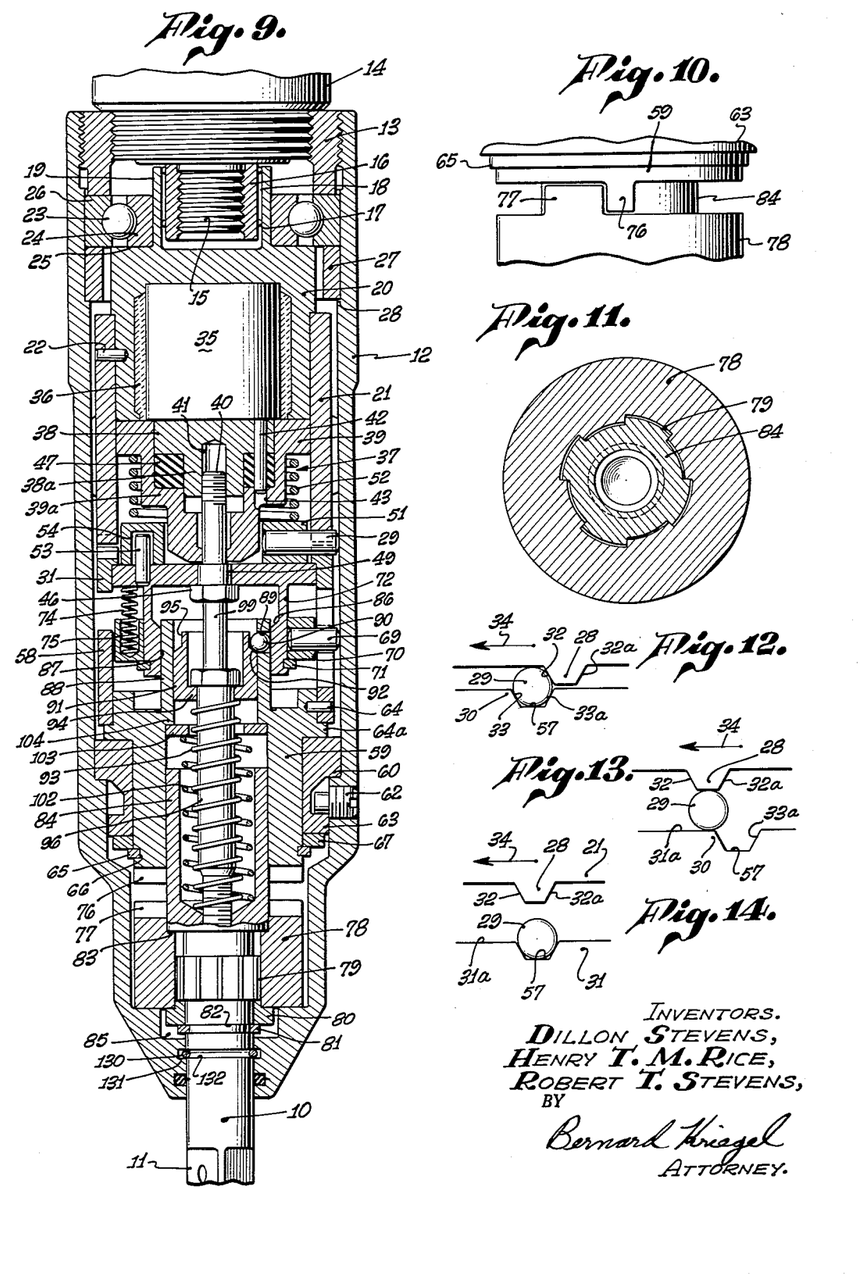
Fig. 9 is a view similar to Figs. 1 and 5, illustrating the primary clutch re-engaged, the latch device reset and the secondary clutch disengaged.
Fig. 10 is a side elevation of the secondary clutch.
Fig. 11 is a cross-section taken along the line 11—11 on Fig. 5.
Fig. 12 is a fragmentary diagrammatic view of the primary clutch, with its parts in driving engagement with one another.
Fig. 13 is a fragmentary diagrammatic view of the primary clutch at the point of complete release.
Fig. 14 is a fragmentary diagrammatic view of the primary clutch with the driven clutch elements completely disengaged from and out of the path of travel of the driving clutch elements.

Assuming that the armature 37 engages the magnet 35 and magnet housing 20, an upward holding force is imposed upon the armature retracting member 45 and driven clutch member 31, holding the latter in an upward position, with the rollers 29 effecting a driving connection between the driving cam teeth 28 and the driven cam teeth 30 (see Figs. 1, 3, 12). The rotation of the prime mover 14 is transmitted through its shaft 15 and magnet housing 20 to the driving clutch member 21, and through the teeth 28 of the latter to the anti-friction rollers 29, which bear against the cam faces 33 of the driven clutch member 31. Because of the inclination of the driving and driven cam teeth faces 32, 33, the torque being transmitted tends to shift the anti-friction rollers 29 and the driven clutch member 31 away from the driving clutch member 21, but such separating movement is resisted and prevented by the holding action of the magnet 35 upon the armature 37. This is evident since the downward thrust of the driven clutch member 31 is transmitted to the armature retracting member 45 and to the head 46 of the gap adjusting screw 40 which is attached to the armature 37 itself.

When the torque being transmitted just exceeds the holding force of the magnet 35 on the armature 37, the latter member is pulled away from the magnet, immediately reducing to substantially zero any further holding force of the magnet on the armature and relieves the force urging the driven clutch member 31 toward the driving clutch member 21. Accordingly, the inclined driving cam teeth 28 shift the rollers 29 in a downward direction, and cause the driven clutch member 31 also to shift in a downward direction, the rollers 29 riding relatively upward on the driven cam faces 33 to the top land 31a on the driven clutch member, and the driving clutch teeth 28 riding completely upward (relatively) upon the rollers, in the manner represented diagrammatically in Fig. 13. The relative angular movement between the rollers 29 and the driven clutch member 31 is permitted by the yieldable rubber cushion and pin connections 55, 53 provided between the roller carrier 51 and the armature retracting member 45.

As soon as the driving clutch teeth 28 ride upon and over the rollers 29, the force that has shifted the carrier 51 angularly with respect to the armature retracting member 45 is released, allowing the rubber cushioning members 55 to bear upon the pins 53 and return the carrier to its initial position relative to the armature retracting member and driven clutch member 31, with the rollers 29 back into alignment with the driven cam faces 33, whereupon the return spring 52 is effective to shift the cage 51 downwardly and locate the rollers 29 in their downward position within the driven clutch member 31, such as illustrated diagrammatically in Fig. 14. The action just described occurs rapidly and before the next succeeding driving clutch tooth 28 can reach the roller, thereby preventing any driving engagement between the succeeding clutch teeth and the anti-friction rollers.

Each driving clutch tooth 28 may be formed with oppositely inclined cam faces 32, 32a, and the driven member 31 may be formed with companion oppositely directed cam faces 33, 33a, in effect forming grooves or pockets 57 in which the rollers 29 are received. This arrangement will adapt the clutch for operation in both directions of rotation and render the apparatus more flexible in its use. The same action, however, will occur when the parts are rotated in a reverse direction, since the cage 51 will move angularly during disconnection of the parts to cause the opposite rubber blocks 55 to engage the pins 53 when the roller carrier is shifted angularly relative to the armature retracting member 45 in the opposite direction. Release of the drive will allow such opposite blocks to engage the pins and return the cage 51 to its initial position, in which the rollers 29 are again relocated within the pockets 57 of the driven clutch member.

The rotation of the driven clutch member 31 is transmitted to a driven splined member 58 that makes a shrink fit with a secondary clutch driving member 59 rotatable within a sleeve bearing 60 secured in position within the casing 12 by being held upon a shoulder 61 in the casing by screws 62 threaded into the casing and engaging a lower bearing flange 63. If desired, a pin connection 64 may also be provided between the driven spline member 58 and the secondary clutch driving member 59. The secondary clutch driving member 59 has a flange 64a resting upon the upper end of the sleeve bearing 60 and is prevented from axial movement by a split snap retainer ring 65 secured within a groove 66 in the driving member and engaging a thrust washer 67 bearing against the lower end of the sleeve bearing.

Since the secondary clutch driving member 59 cannot partake of axial movement, and since the driven member 31 of the primary clutch moves axially during its shifting between clutching and unclutching positions with respect to the driving clutch member, a spline connection is provided between the driven clutch member 31 and the driven splined member 58 secured to the secondary clutch driving member 59. In order to minimize sliding friction between the driven clutch member and the driven spline member, the former is provided with depending circumferentially spaced splines 68, each of which fits between radial roller elements 69 that are rotatable within a suitable carrier 70 supported upon a split snap ring 71 secured to a depending skirt portion 72 of the armature retracting member 45. The roller 69 on one side of each spline 68 is engageable with a spline face 73 on the driven spline member 58; whereas, the roller 69 on the opposite side of the driven clutch spline 68 is engageable with an opposing spline face 73 on the driven spline member 58, thereby adapting the spline connection for operation of the apparatus in both rotary directions.

It is apparent that the rotation imparted to the driven clutch member 31 is transmitted through the splines 68 and anti-friction rollers 69 to the driven spline member 58, and from the latter to the secondary clutch driving member 59. During downward shifting of the driven clutch member 31, such rotational engagement is maintained, the rollers 69 merely riding downwardly along the spline walls 73 of the driven spline member and carrying their supporting cage 70 downwardly with them. Such downward movement of the cage is permitted, since the snap retainer ring 71 moves downwardly with the armature retracting member 45 and driven clutch member 31 a greater distance (actually twice the distance) than the roller cage 70 is moved in a downward direction, as a result of rolling of the anti-friction rollers 69 along the walls 73 of the spline member 58. Normally, the cage 70 is maintained in engagement with the supporting snap ring 71 by a plurality of circumferentially spaced helical compression springs 74 bearing upon the armature retracting member 45 and the cage itself, these springs being retained in proper position by being received within pockets 75 formed in the cage.

The rotation of the secondary clutch driving member 59 is transmitted through its axially extending clutch teeth or dogs 76 to clutch teeth or dogs 77 on a secondary clutch driven member 78, which makes a spline connection 79 with the spindle 10 extending axially and outwardly through the lower end of the casing 12. The driven member 78 is secured to the spindle 10 by resting upon a lower washer 80, which, in turn, engages a split snap retainer ring 81 received within a spindle groove 82. The upper portion of the secondary clutch driven member 78 engages a shoulder 83 provided by a hollow spindle head 84 rotatable within the secondary clutch driving member 59. Suitable clearance 85 is provided between the lower end of the driven member 78 and the lower end of the casing 12 to allow the spindle 10 and driven member to move in a downward direction and disengage the driven clutch dogs 77 from the driving clutch dogs 76, in order that no rotation is imparted to the spindle, regardless of the connection or disconnection of the primary clutch elements 28, 29, 30 with one another.

Once the primary clutch members 28, 29, 30 have been disconnected, following the pulling away of the armature 37 from the magnet 35 and magnet housing 20, it is desired to hold such parts in their disengaged position until purposely allowed to re-engage by the operator. Such holding action is effected by securing the armature retracting member 45, driven clutch member 31 and armature 37 in a downward direction. To accomplish this purpose, the depending sleeve portion 72 of the armature retracting member is provided with an internal latch shoulder 86 that is inclined in a downward and inward direction. The inner end of this shoulder terminates at the inner cylindrical wall 87 of the depending sleeve 72, which is slidable along an upwardly extending cylindrical portion 88 of the secondary clutch driving member 59. This cylindrical portion is provided with a plurality of radial holes 89 receiving latch balls 90, which may either extend inwardly of the cylindrical portion 88, in which event the latch balls are ineffective to hold the armature retracting member 45 in a downward position, or in an outward direction in engagement with the latch shoulder 86, in which the balls are effective to hold the armature retracting member 45 and driven clutch member 31 in a released position.

Disposed within the latch cylinder 88 is a latch cam and retainer sleeve 91 that is slidable along and within the former. This retainer has a tapered peripheral cam shoulder 92 inclined in a downward and outward direction and engageable with the balls 90. A helical actuating spring 93 is disposed within the spindle head 84, its lower end engaging the spindle and its upper end an inwardly directed flange 94 on the latch sleeve 91, in order to urge the latch sleeve in an upward direction and cause its cam shoulder 92 to urge the latch balls 90 in an outward direction. Inward movement of the balls is limited by its engagement with the reduced diameter upper end 95 of the latch sleeve.

Figure 5:
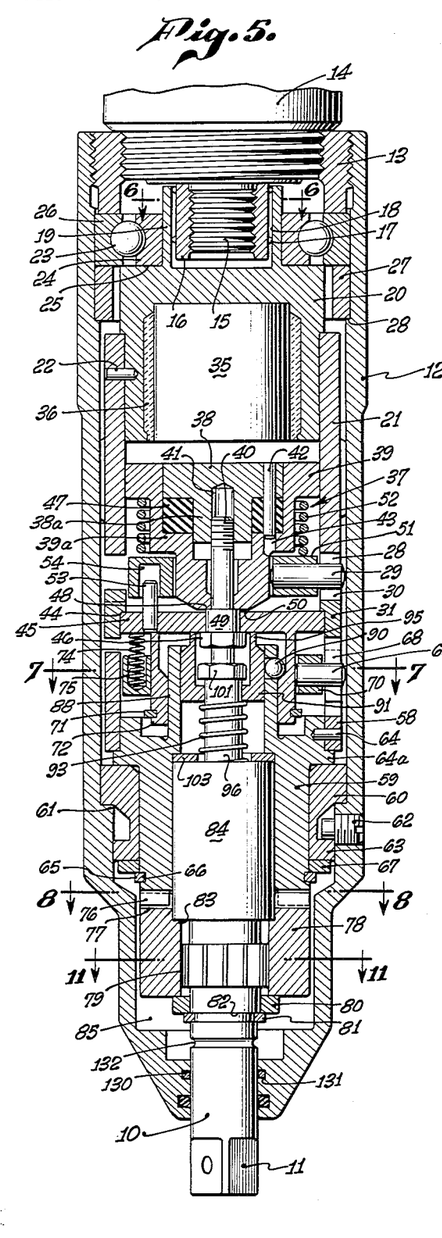
Fig. 5 is a view similar to Fig. 1, disclosing the primary clutch at the moment of disengagement, upon being subjected to a predetermined torque, and latched out of engagement.
Figure 6:
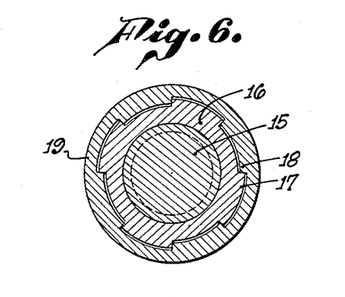
Fig. 6 is an enlarged cross-section taken along the line 6—6 on Fig. 5.
Figure 7:
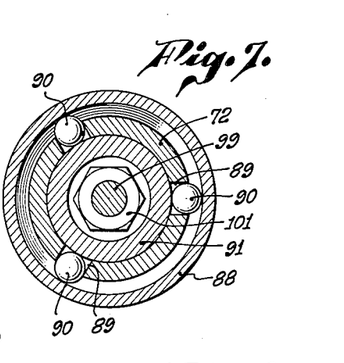
Fig. 7 is a cross-section, on an enlarged scale, of the latch device for holding the primary clutch disengaged, taken along the line 7—7 on Fig. 5.
Figure 8:
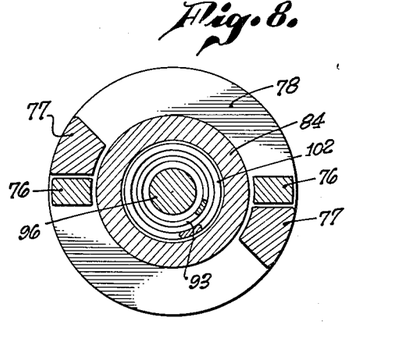
Fig. 8 is a cross-section, on an enlarged scale, taken along the line 8—8 on Fig. 5.

When the torque transmitted exceeds a predetermined maximum value, the armature retracting member 45 is shifted in a downward direction with the driven clutch member 31. When the latch shoulder 86 on the armature retracting member reaches a position in alignment with the latch balls 90, the latter are urged outwardly by the cam shoulder 92 of the spring actuated latch sleeve 91 to a position on top of the latch shoulder 86, the latch sleeve 91 then sliding past the balls and across the cylinder apertures 89, to present the cylindrical periphery of the sleeve 91 against the balls, preventing the inclined latch shoulder 86 from shifting the balls inwardly out of their latching position. Upward movement of the latch sleeve 91 to the position just referred to is limited by engagement of its upper end with the armature retracting member 45, as shown in Fig. 5.

The primary clutch will remain in disconnected position, the rollers 29 and driven clutch member 31 being latched out of operative position with respect to the driving clutch member 21 so long as the latch sleeve 91 is disposed in its upward position. This latch sleeve is shifted downwardly to its initial ball releasing position upon downward movement of the spindle 10 within the housing 12.

To effect the aforementioned releasing movement of the latch sleeve 91, a latch releasing member 96 extends through the hollow spindle head 84 and is threaded into the spindle 10. The releasing member 96 is preferably made hollow to slidably receive a depending stem 99 of the gap adjusting screw 40, which is freely piloted within the releasing member. If desired, a helical compression spring 100 may be disposed in the latter part, bearing upon the lower shoulder of its bore and upon the stem 99, so as to assist in reengagement of the armature 37 with the magnet 35, although such assistance is ordinarily unnecessary. The releasing member 96 is provided with an upper head 101 adapted to engage the inturned shoulder 94 of the latch sleeve 91 and effect release of the latter.

The spindle 10 is urged axially in an outward direction, to disengage the secondary clutch driven member 78 from the driving member 59 and to shift the latch releasing member 96 downwardly, by a helical compression spring 102 disposed within the hollow spindle head 84, the lower end of the spring bearing upon the spindle and its upper end upon a spring seat 103 resting against a shoulder 104 formed in the secondary clutch driving member 59. Assuming that the latch sleeve 91 is in the upward position, to hold the latch balls 90 upon the latch shoulder 86, for the purpose of maintaining the primary clutch in disengaged position, and that an inwardly directed axial force is imposed upon the spindle 10, the releasing head 101 on the releasing member will be disposed above the latch sleeve shoulder 94, as shown in Fig. 5. However, upon releasing the endwise, inwardly directed force on the spindle 10, its return spring 102 will expand to shift the spindle downwardly and disengage the driven member clutch dogs 77 from the driving member clutch dogs 76. The spindle may be maintained in such clutch disengaging position by a suitable detent device, like a split, contractile ring 130 disposed in a casing groove 131 and releasably receivable in a spindle groove 132. Downward movement also engages the releasing head 101 with the latch sleeve shoulder 94, returning the latch sleeve 91 downwardly to its initial position, in which its cam shoulder 92 is disposed below the balls 90. The attracting force of the magnet 35 is then effective to shift the armature 37 upwardly, carrying the armature retracting member 45 with it, and causing the latch shoulder 86 to relocate the balls 90 in their inward, ineffective position, in which they are retained by the inner cylindrical wall 87 of the retracting member skirt 72 (see Fig. 9). The upward shifting of the armature 37, the armature retracting member 45, driven clutch member 31, carrier 51 and clutch rollers 29 may be assisted by the upward force exerted by the return spring 100 upon the gap adjusting screw 40.

Despite the fact that the primary clutch has been reengaged and all of the clutch parts placed in rotation, the spindle 10 will still remain free of rotation, inasmuch as the secondary clutch driven member 78 has been disengaged from the secondary clutch driving member 59 (Fig. 9), being held in disengaged position by the detent 130. It is only when the spindle 10 is again shifted upwardly, to release the detent from the spindle groove 132, that the clutch dogs 76, 77 can reengage and the drive to the spindle reestablished.

The specific tool disclosed in the drawings has been designed particularly for use in rotating and tightening threaded fastening elements. Iinitially, the parts occupy the position disclosed in Fig. 9, in which the armature 37 engages the magnet 35 and its housing 20, to hold the primary clutch elements 28, 29, 30 in operative driving position with respect to each other. The spindle 10 and the secondary clutch driven member 78, however, are stationary, despite the energization of the prime mover 14 and rotation of the other parts of the mechanism. When the spindle 10 is placed in driving relation to the threaded fastening element (not shown), an axial force then imposed on the apparatus shifts the spindle inwardly and places the secondary clutch driven dogs 77 in engagement with the driving clutch dogs 76, whereupon the apparatus is effective to rotate the spindle 10 and the threaded fastening element attached thereto.

As the threaded fastening element becomes tightened, the torque transmitted through the apparatus, and paricularly the primary clutch, increases, there being a tendency for the torque to shift the rollers 29 upwardly along the driven cam faces 33 and the driven clutch member 31 in a downward direction against the resisting attracting force of the magnet 35 on the armature 37. When the torque just exceeds the holding force of the magnet, the armature 37 is released, the driving cam faces 32 acting through the rollers 29 to shift the driven clutch members 31, armature retracting member 45 and armature 37 downwardly. Such downward action is facilitated, since the release of the armature 37 from the magnet 35 has effectively removed the force holding the primary clutch elements in operative position. As a result, there is an exceedingly rapid downward shifting of the driven cluch member 31, rolling of the rollers 29 upon the lands 31a, and rolling of the rollers 29 in a relatively downward direction along the cam faces 32 of the driving teeth 28 to the position depicted in Fig. 13, in which the driving member 21 can ride past the rollers. During such action, as described above, the roller cage 51 is moved angularly with respect to the armature retracting member 45 and driven member 31. But as soon as disengagement from the driving cam teeth 28 occurs, the rubber spring-like cushioning elements 55 are effective to relocate the cage 51 in its initial position, allowing the cage return spring 52 to shift the cage downwardly and locate the rollers 29 in the driven member pockets 57, completely out of the path of travel of the driving clutch teeth 28 (Fig. 14).

Upon the driven clutch member 31 and armature retracting member 45 being shifted downwardly, the latch shoulder 86 on the retracting member skirt 72 becomes located in alignment with the latch balls 90, allowing the spring 93 to shift the latch sleeve 91 upwardly, camming the balls outwardly to the position disclosed in Fig. 5, in which the balls 90 are held within the cylindrical extension 88 and upon the latch shoulder 86, being prevented from moving out of this latching position by the cylindrical periphery of the latch sleeve 91.

The parts remain in such unclutched position, in which no driving effort is imparted to the spindle 10, until the tool is removed from the threaded fastening element, whereupon the spring 102 is effective to shift the spindle 10 downwardly, disengaging the driven clutch dogs 77 from the driving clutch dogs 76, and shifting the releasing head 101 against the latch sleeve shoulder 94. This action moves the latch sleeve 91 downwardly; allowing the latch balls 90 to be reshifted inwardly by the latch shoulder 86, upon upward movement of the retracting member 45 under the influence of the attracting force of the magnet 35 on the armature 37, which again places the primary clutch parts in driving position (Fig. 9). With the motor running, the drive takes place again through the primary clutch device and the spline connection 68, 69, 58, to the secondary clutch driving member 59. However, the spindle 10 is not being rotated at this time, and will not be rotated until it is shifted inwardly against the force of its return spring 102 upon being applied to another threaded fastening element.

In view of the fact that the primary clutch releases upon being subjected to a predetermined torque, and is latched in such released position, continued rotation of the prime mover 14 can have no effect in applying turning effort to the spindle 10. Similarly, since the latch is not released to permit reengagement of the primary clutch until after the spindle has disengaged the secondary clutch 76, 77, continued rotation of the prime mover can still have no effect in rotating the spindle. As a result, the prime mover may continue its rotation and without interruption. Turning effort applied to the spindle 10 ceases immediately upon imposing a predetermined torque on the threaded fastening element, and such turning effort is not reimposed until after the spindle has been applied to another threaded fastening element and the secondary clutch engaged.

The torque at which the primary clutch becomes disengaged may be varied by rotating the gap adjusting screw 40 and altering the gap between the adjustable armature section 38 and the magnet 35. The adjustment will remain fixed, since the elastic cushioning member 47 between the outer armature body 39 and central section 38 serves to keep the mating threads of the screw and adjustable section tightly against one another. The adjustment can occur to any extent within the limit of movement of the adjustable armature section 38, which allows the torque, at which the armature 37 and primary clutch will release, to be infinitely varied between limits.

Only a slight relative movement between the driving cam teeth 28, rollers 29 and driven cam teeth 30 is necessary in disengaging the armature 37 from the magnet 35. Most of the movement occurs after such force has been reduced to substantially zero. As a result, the primary clutch is released under substantially no-load conditions, and without the necessity for the parts moving substantial distances under a heavy load condition. This reduces the wear on the parts, as well as the friction to which the parts are subjected, and imparts great accuracy to the device, insuring release of the clutch at the predetermined torque for which the armature is adjusted. Prior to release of the primary clutch, the armature 37 itself remains engaged, to hold the clutch members 28, 29, 30 engaged with a constant force, regardless of increase or variations in the torque being transmitted through the primary clutch.

Figure 15:
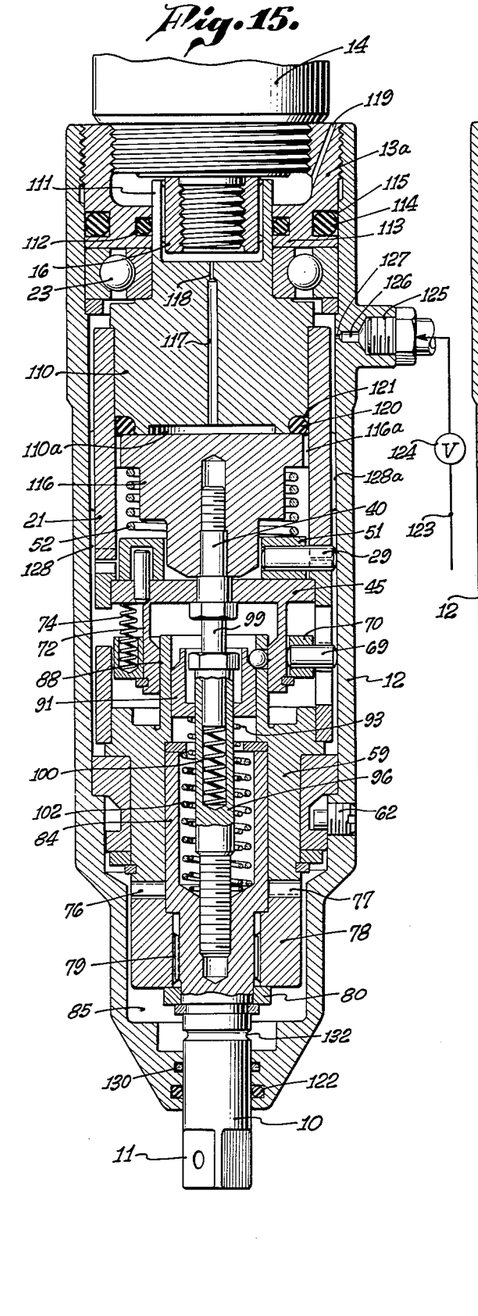
Fig. 15 is a longitudinal section, parts being shown in elevation, of a modified form of torque transmitting apparatus.
Figure 16:
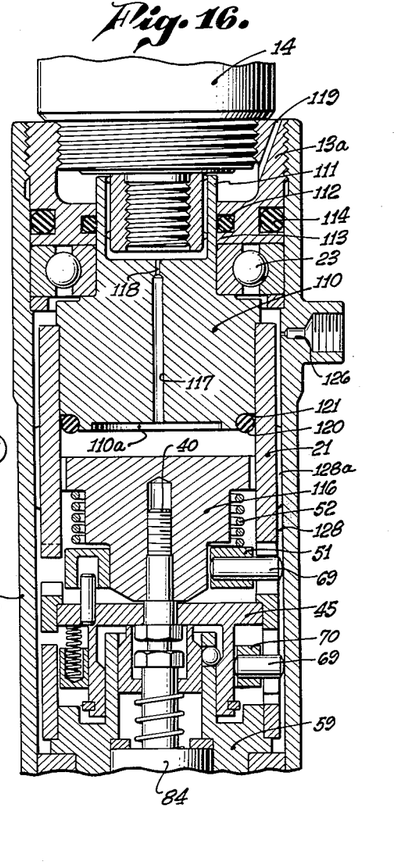
Fig. 16 is a partial longitudinal section, similar to Fig. 15, disclosing the parts at the point of complete clutch release, the clutch being latched in released position.

In the embodiment of the invention illustrated in Figs. 15 and 16, the force holding the primary clutch elements in driving engagement is supplied by a fluid actuated mechanism. Essentially, the parts are the same as in the other form of the invention, with the exception of the provision of a fluid holding device instead of the magnetic holding device.

The prime mover 14 rotates a valve body 110 which is secured to the driving clutch member 21 of the primary clutch device. Fluid leakage around the exterior of the extension 111 of this body is prevented by a suitable side seal 112 in a flange portion 113 of the adapter ring 13a, that is threadedly connected to both the casing 12 and the prime mover housing 14. Leakage between the casing and adapter is also prevented by a suitable side seal 114 contained in a groove 115 in the adapter 13a and engaging the inner wall of the casing.

The screw 40 which extends through the retracting member 45 is threaded into a valve head, plunger, or piston 116 adapted to engage the lower end of the valve body 110 and prevent passage of fluid under pressure from within the casing 12 out through a fluid exhaust passage 117 extending through the valve body. A suitable orifice 118 may be provided in this passage to retard the escape of fluid from the casing 12 upon retraction of the valve head 116 from the valve body 110. Such fluid, when allowed to flow through the passage 117 and orifice 118, will pass to the exterior of the casing 12 through the space provided between the threaded sleeve 16 and body extension 111, and through a fluid outlet or vent 119 extending through the adapter ring 13a.

When the head 116 is engaged with the valve body 110, leakage is prevented by a suitable gasket 120, which may be in the form of a rubber, or rubber-like, O ring in a peripheral groove 121 in the lower portion of the valve body 110. When engaged by the valve head 116, the gasket is compressed into firm sealing engagement with the latter; to prevent fluid leakage into the passage 117. Leakage from the casing 12 in a downward direction is prevented by a shaft seal 122 engaging the spindle 10.

The roller carrier 51 may be disposed around the valve body 116, being urged in a downward direction by the return spring 52 disposed between the valve head 116 and the carrier, in the same manner as in the other form of the invention. Similarly, a valve head return spring 100 is mounted within the latch releasing member 96, engaging the depending stem 99 of the attaching screw 40, to urge the valve head 116 toward closed position and into firm sealing engagement with the gasket 120.

Fluid under pressure from a suitable source can flow through a line 123 and a pressure regulator 124 into a fluid inlet 125 secured to the casing 12. This inlet communicates with a port 126 in the casing having a metering orifice 127 therein, to restrict the rate at which the fluid can flow into the casing 12. Such fluid will pass downwardly through longitudinal grooves 128a and the clearance space 128 around the driving clutch member 21 for action upon the underside of the valve head 116, urging and holding it in an upward direction, in a position closing the exhaust passage 117, which is open to the atmosphere. The unit fluid pressure in the casing 12 determines the total force holding the valve head 116 in an upward position, holding the primary clutch elements 28, 29, 30 in driving engagement with each other. This force remains constant during the rotation of the various parts, and as the torque transmitted increases.

When the torque exceeds a predetermined value corresponding to the holding force of the fluid on the valve head 116, the latter is shifted downwardly by the primary clutch elements 28, 29, 30, retracting member 45 and attaching screw 40, the head pulling away from the gasket 120 and opening the exhaust passage 117. Immediately upon such opening, the fluid on the high pressure side of the head 116 can flow around the periphery of the valve head, or through side grooves 116a provided therein, to the other side of the valve head, thereby equalizing the pressure on each side and reducing the holding force to near-zero, the fluid escaping through the fluid passage 117, orifice 118 and fluid outlet 119 to the exterior of the casing 12. The equalizing and escape of the pressure occurs very rapidly, releasing the holding force on the primary clutch parts, and allowing them to be shifted downwardly, substantially instantaneously, to fully released position, in which relation they are held by the latch device 72, 90, 91. Upon retraction of the latch sleeve 91, in the manner described above, the valve head return spring 100 will reshift the valve head 116 upwardly into engagement with the gasket 120, allowing the fluid pressure differential to again act on the valve head, holding it in an upward position with a predetermined force, and correspondingly holding the primary clutch elements 28, 29, 30 in driving relation with respect to each other.

The fluid under pressure, which may be compressed air, can flow into the casing 12 only at a retarded rate, because of the inlet metering orifice 127; so that there is very little loss of air from the casing when the valve head 116 is forced away from the valve body 110 to open the exhaust passage 117. Upon downward shifting of the valve head, the air pressure on both sides thereof becomes substantially equalized instantaneously, since the outlet orifice 118 prevents rapid escape of air from the mechanism and causes a rapid build-up of pressure on the outlet or low pressure side of the valve head 116. To prevent the formation of excessive and variable vacuums over extended and indefinite areas, between the face of the valve head 116 and the valve body 110, which might arise under conditions of very rapid opening, if there were metal to metal contact between these faces, and which might adversely affect the accuracy of the clutch release point, the lower end of the valve body 110 may be provided with a shallow chamber 110a extending across its face. The chamber 110a is preferably made comparatively shallow; so as to provide a small volume to be filled by the high pressure air as it flows around the valve head 116, thereby insuring that substantially instantaneous equalizing of the air pressure on both sides of the head takes place, once the valve head is pulled away from the body 110, upon transmission of a torque that just exceeds the predetermined value corresponding to the air pressure tending to hold the valve head closed against the gasket and the body.

The fluid controlled device illustrated in Figs. 15 and 16 is very easily adjusted, to vary the force holding the valve head 116 in closed position against the valve body 110, simply by varying the air pressure entering the casing 12. This adjustment is made simply by suitable manipulation or adjustment of the pressure regulator 124.

In all respects, the air device and the magnetic device operate in the same manner, the releasable torque transmitting mechanism partaking of the same cycle of operation. In both cases, a constant force is provided, holding the primary clutch parts in driving engagement despite variations or increase in the torque being transmitted through the apparatus. When the torque exceeds a predetermined maximum, the holding force on the clutch parts is immediately overcome and rapidly reduced to substantially zero, causing declutching to occur under a substantially no-load condition. The parts are positively held out of clutching relation, to preclude hammering action as the prime mover continues rotation, the latch 91, 90 being released only upon removal of the spindle 10 from the threaded fastening element, or other work, whereupon the primary clutch is automatically reengaged without any rotation being imparted to the spindle. The spindle may then be applied to other work or the same work, which causes the secondary clutch 76, 77 to engage and torque again be transmitted to the spindle.

The modified form of apparatus disclosed in Figs. 15 and 16 is described and claimed in applicants' divisional application, Serial No. 550,889, filed December 5, 1955, for "Releasable Torque Transmitting Apparatus."

The inventors claim:

1. In torque transmitting apparatus: driving and driven members; coengaging elements on said members effecting a rotatable driving connection between said members, said elements being responsive to the torque transmitted through said members and tending to be shifted axially with respect to each other by such torque to disengaged position from each other; and means carried by and rotatable with said members exerting an axially directed, constant holding force on one of said members to maintain said elements in driving engagement with each other, the force exerted by said means remaining constant as the torque transmitted through said elements increases.

2. In torque transmitting apparatus: driving and driven members; coengaging clutch elements on said members effecting a rotatable driving connection between said members, said elements comprising cam means responsive to the torque transmitted through said members and tending to shift said elements axially from each other to disengaged position; and means carried by and rotatable with said members exerting an axially directed force on one of said members to hold said clutch elements in driving engagement with each other, such force remaining constant and independent of the torque transmitted through said driving and driven members.

3. In torque transmitting apparatus: driving and driven members; coengaging clutch elements on said members effecting a rotatable driving connection between said members, said elements comprising cam instrumentalities responsive to the torque transmitted through said members and tending to shift said elements axially from each other to disengaged position; first means engageable and rotatable with one of said members; second means rotatable with the other of said members, one of said means being axially movable, said second means exerting an axially directed force on said first means to hold said clutch elements in driving engagement with each other, such force remaining constant and independent of the torque transmitted through said driving and driven members.

4. In torque transmitting apparatus: driving and driven members; coengaging axially directed clutch elements on said members effecting a rotatable driving connection between said members, said elements comprising cam means responsive to the torque transmitted through said members to shift one of said members axially away from the other of said members to disengage said elements from each other; axially movable means engageable with one of said members to hold said elements in driving relation to each other, said elements tending to shift said holding means axially to release said elements from such driving relation; and means separate from and rotatable with one of said members for exerting a constant axially directed force on said holding means in opposition to the force exerted on said holding means by said elements while torque is being transmitted through said elements, the force of said exerting means on said holding means constituting substantially the total force exerted on said holding means to hold said elements in driving relation to each other and remaining constant as the torque transmitted through said elements increases from zero up to the predetermined maximum value at which disengagement between said clutch elements occurs, said exerting means releasing its force on said holding means upon initial slight axial movement of said axially movable means in response to torque transmission through said elements exceeding said predetermined maximum value to reduce the total force holding said clutch elements coengaged to substantially zero, whereby full disengagement between said coengaging clutch elements occurs under substantially no load.

5. In torque transmitting apparatus: driving and driven members; coengaging clutch elements on said members effecting a rotatable driving connection between said members, said elements comprising cam means responsive to the torque transmitted through said members and tending to shift said elements axially from each other to disengaged position; axially movable means engageable and rotatable with one of said members to hold said elements in driving relation to each other, said elements tending to shift said holding means axially to release said elements from such driving relation; and magnetic means rotatable with the other of said members and exerting an axially directed magnetic force on said holding means in opposition to the axially directed force exerted on said holding means by said elements while torque is being transmitted through said elements.

6. In torque transmitting apparatus: driving and driven members; coengaging clutch elements on said members effecting a rotatable driving connection between said members, said elements comprising cam instrumentalities responsive to the torque transmitted through said members and tending to shift said elements axially from each other to disengaged position; means engageable and rotatable with one of said members; magnetic means rotatable with the other of said members; one of said means being axially movable; said magnetic means exerting an axially directed magnetic force on said other means to hold said elements in driving relation to each other and in opposition to the axially directed force exerted by said elements while torque is being transmitted through said elements, which force tends to axially shift one of said means with respect to the other of said means.

7. In torque transmitting apparatus: driving and driven members; coengaging clutch elements on said members effecting a rotatable driving connection between said members, said elements comprising cam means responsive to the torque transmitted through said members and tending to shift said elements axially from each other to disengaged position; axially movable means engageable and rotatable with one of said members to hold said elements in driving relation to each other, said elements tending to shift said holding means axially to release said elements from such driving relation; and a permanent magnet rotatable with the other of said members and exerting a constant axially directed magnetic force on said holding means in opposition to the force exerted on said holding means by said elements while torque is being transmitted through said elements.

8. In torque transmitting apparatus: driving and driven members; coengageable clutch elements on said members effecting a rotatable driving connection between said members, said elements comprising cam instrumentalities responsive to the torque transmitted through said members and tending to shift said elements axially from each other to disengaged position; means engageable and rotatable with one of said members; from permanent magnetic means rotatable with the other of said members; one of said means being axially movable; said permanent magnetic means exerting an axially directed magnetic force on said other means to hold said elements in driving relation to each other and in opposition to the axially directed force exerted by said elements while torque is being transmitted through said elements, which force tends to axially shift one of said means with respect to the other of said means.

9. In torque transmitting apparatus; driving and driven members; coengaging elements on said members effecting a rotatable driving connection between said members, said elements being responsive to the torque transmitted through said members and tending to be shifted axially with respect to each other by such torque to disengaged position from each other; and a magnet rotatable with one of said members exerting an axially directed holding force on one of said members to maintain said elements in driving engagement with each other in opposition to the disengaging force of the torque being transmitted through said elements.

10. In torque transmitting apparatus; driving and driven members; coengaging clutch elements on said members effecting a rotatable driving connection between said members, said elements comprising cam means responsive to the torque transmitted through said members to disengage said elements from each other; means engageable and rotatable with one of said members to hold said elements in driving relation to each other, said elements tending to shift said holding means axially to release said elements from such driving relation; a magnet rotatable with the other of said members for exerting a force on said holding means in opposition to the force exerted on said holding means by said elements while torque is being transmitted through said elements; and means for varying the gap between said magnetic and holding means.

11. In torque transmitting apparatus: driving and driven members; coengaging clutch means on said members effecting a rotatable driving connection between said members, said elements comprising cam means responsive to the torque transmitted through said members to disengage said elements from each other; axially movable means engageable and rotatable with said driven member to hold said elements in driving relation to each other, said elements tending to shift said holding means axially to release said elements from such driving relation; and a magnet rotatable with said driving member and exerting an axially directed force on said holding means in opposition to the axial force exerted on said holding means by said elements while torque is being transmitted through said said elements.

12. In torque transmitting apparatus; driving and driven members; coengageable elements on said members effecting a rotatable driving connection between said members; a magnet rotatable with one of said members; and holding means rotatable with the other of said members and attractable axially by said magnet for exerting an axial force maintaining said elements in driving relation with respect to each other.

13. In torque transmitting apparatus: driving and driven members; coengageable axially extending clutch elements on said members effecting a rotatable driving connection between said members and responsive to the torque being transmitted to shift said members axially with respect to each other and release said clutch elements from one another to disrupt such driving connection; latch means rotatable by and engageable with said driven member for holding said elements released from one another; and driven means rotatable by said driven member and movable with respect to said driven member in a direction axially away from said driving member to withdraw said latch means from its holding position.

14. In torque transmitting apparatus: driving and driven members; coengaging clutch elements on said members effecting a rotatable driving connection between said members, said elements comprising cam means responsive to the torque transmitted through said members to shift said members axially with respect to each other to disengage said elements from each other; means exerting an axially directed force on said driven member to hold said clutch elements in driving engagement with each other in opposition to the axial shifting force of said cam means, such force remaining constant and independent of the torque transmitted through said driving and driven members; latch means rotatable by and engageable with said driven member for holding said clutch elements disengaged from each other; and means rotatable by said driven member and movable in a direction away from said driving member to release said latch means from its holding position.

15. In torque transmitting apparatus: driving and driven members; coengaging clutch elements on said members effecting a rotatable driving connection between said members, said elements comprising cam means responsive to the torque transmitted through said members to shift said members axially with respect to each other to disengage said elements from each other; means exerting an axially directed force on said clutch elements to hold them in driving engagement with each other in opposition to the axial shifting force of said cam means, such force remaining constant and independent of the torque transmitted through said driving and driven members; latch means for holding said clutch elements disengaged from each other; and means rotatable by said driven member and movable axially in the direction opposite to that exerted by said holding means in holding said elements in engagement with each other to release said latch means from its holding position.

16. In torque transmitting apparatus: driving and driven members; coengaging clutch means on said members effecting a rotatable driving connection between said members; said elements comprising cam means responsive to the torque transmitted through said members to disengage said elements from each other; axially movable means engageable with one of said members to hold said elements in driving relation to each other, said elements tending to shift said holding means axially to release said elements from such driving relation; means for exerting a force on said holding means in opposition to the force exerted on said holding means by said elements while torque is being transmitted through said elements; latch means engageable with said holding means to secure said elements in released position; means rotatable by said driven member and axially movable in the same direction as said holding means when said elements are released from driving relation to release said latch means from said holding means;

and spring means engaging and adapted to move said rotatable means in said same direction.

17. In torque transmitting apparatus; driving and driven members; coengaging clutch elements on said members effecting a rotatable driving connection between said members; said elements comprising cam means responsive to the torque transmitted through said members to disengage said elements from each other; axially movable means engageable with one of said members to hold said elements in driving relation to each other, said elements tending to shift said holding means axially to release said elements from such driving relation; means for exerting a force on said holding means in opposition to the force exerted on said holding means by said elements while torque is being transmitted through said elements; latch means engageable with said holding means to secure said elements in released position; an axially movable second driven member; means including a clutch for effecting a rotatable connection between said driven member and second driven member; and means operable by said second driven member in moving axially to disengage said clutch for releasing said latch means from said holding means.

18. In torque transmitting apparatus: driving and driven members; coengageable clutch elements on said driving and driven members effecting a rotatable driving connection between said members, comprising a cam on one of said members and a rollable element movable axially of and engageable by said cam to effect disengagement between said cam and rollable element in response to the torque transmitted therebetween and means operatively connected to said rollable element for holding said rollable element disengaged from said cam upon axial movement of said rollable element out of engagement with said cam.

19. In torque transmitting apparatus: driving and driven members; a cam on one of said members; a cam on the other of said members; a rollable element movable axially of one of said members and engageable with both cams to effect a rotatable driving connection between said members, said rollable element being movable axially out of engagement with said one of said cams in response to the torque transmitted therebetween; and means operatively connected to said rollable element for holding said rollable element disengaged from said one of said cams upon axial movement of said rollable element out of engagement with said one of said cams.

20. In torque transmitting apparatus: driving and driven members axially movable with respect to each other; an axial cam on one of said members; an axial cam on the other of said members; a rollable element engageable with both cams to effect a rotatable driving connection between said members; and tending to effect relative axial movement between said members; a carrier for said rollable element; and yieldable means between said carrier and one of said members to allow limited angular movement therebetween.

21. In torque transmitting apparatus: driving and driven members axially movable with respect to each other; an axial cam on one of said members; an axial cam on the other of said members; a rollable element engageable with both cams to effect a rotatable driving connection between said members and tending to effect relative axial movement between said members; a carrier for said rollable element; and yieldable means between said carrier and driven member to allow limited angular movement therebetween.

22. In torque transmitting apparatus; driving and driven members; coengageable elements on said members effecting a rotatable driving connection between said members and responsive to the torque being transmitted to axially shift said driven member with respect to said driving member to release said elements from engagement; means providing a slidable spline connection rotatable with said driven member, said connection including a driving spline, a driven spline, one or more rollers engaging said driving and driven splines, and a carrier for said rollers confining them for rotation about generally radial axes.

23. In torque transmitting apparatus: a driving member; a first driven member; coengageable elements on said members effecting a rotatable driving connection between said members and responsive to the torque being transmitted to release said elements from each other and axially shift said driven member; means providing a slidable spline connection rotatable with said driven member; a second driven member; and a releasable clutch for effecting a driving connection between said spline connection and second driven member.

24. In torque transmitting apparatus: a driving member; a first driven member; coengageable elements on said members effecting a rotatable driving connection between said members and responsive to the torque being transmitted to release said elements from each other and axially shift said first driven member; latch means for holding said first driven member and its element released from said driving member; means providing a slidable spline connection rotatable with said first driven member; a second driven member; a releasable clutch for effecting a driving connection between said spline connection and second driven member; and means operable by said second driven member in moving in a direction disengaging said clutch to release said latch means and allow reengagement between said coengageable elements.

25. In torque transmitting apparatus: driving and driven members; coengaging clutch elements on said members effecting a rotatable driving connection between said members, said elements comprising cam means responsive to the torque transmitted through said members to shift said driven member away from said driving member to disengage said elements from each other; means exerting an axially directed force on said driven member to urge said driven member toward said driving member and tend to maintain said elements coengaged; latch means rotatable by and engageable with said driven member to hold said driven member away from said driving member; a retainer member engageable with said latch means to retain said latch means in holding engagement with said driven member; means movable in the same direction as said driven member in disengaging said elements from each other to shift said retainer member from retaining engagement with said latch means; and spring means engaging and adapted to move said retainer shifting means in said same direction.

26. In torque transmitting apparatus: driving and driven members; coengaging clutch elements on said members effecting a rotatable driving connection between said members, said elements comprising cam means responsive to the torque transmitted through said members to shift said driven member away from said driving member to disengage said elements from each other; means exerting an axially directed force on said driven member to urge said driven member axially toward said driving member and tend to maintain said elements coengaged; latch means rotatable by and engageable with said driven member to hold said driven member away from said driving member; a retainer member engageable with said latch means to retain said latch means in holding engagement with said driven member; an axially movable second driven member; means including a clutch for effecting a rotatable connection between said driven member and second driven member; and means shiftable by said second driven member in moving axially away from said driving member to disengage said clutch for shifting said retainer member from retaining engagement with said latch means.

27. In torque transmitting apparatus: a driving member; a first driven member; coengageable elements on said members effecting a rotatable driving connection between said members and responsive to the torque being transmitted to release said elements from each other and axially shift one of said members; latch means for holding said one member and its element released from said other member; a second driven member; means including a releasable clutch for effecting a driving connection between said first and second driven members; and means operable by said second driven member in moving in a direction disengaging said clutch to release said latch means and allow reengagement between said coengageable elements.

28. In torque transmitting apparatus: driving and driven members; coengageable elements on said members effecting a rotatable driving connection between said members, said elements comprising cam means responsive to the torque transmitted through said members to shift one of said members away from the other of said members to disengage said elements from each other; means exerting an axially directed force on said one member to urge said one member toward the other of said members and tend to maintain said elements coengaged; latch means rotatable by and engageable with said one member to hold said one member away from said other member; a retainer member engageable with said latch means to retain said latch means in holding engagement with said one member; means movable in a direction away from said driving member to shift said retainer member from retaining engagement with said latch means; and spring means engaging and adapted to move said retainer shifting means in said same direction.

29. In torque transmitting apparatus: driving and driven members; coengageable clutch elements on said members effecting a rotatable driving connection between said members, said elements comprising cam means responsive to the torque transmitted through said members to shift one of said members away from the other of said members to disengage said elements from each other; means exerting an axially directed force on said one member to urge said one member axially toward said other member and tend to maintain said elements coengaged; latch means rotatable by and engageable with said one member to hold said one member away from said other member; a retainer member engageable with said latch means to retain said latch means in holding engagement with said one member; an axially movable second driven member; means including a clutch for effecting a rotatable connection between said driven member and second driven member; and means shiftable by said second driven member in moving axially away from said driven member to disengage said clutch for shifting said retainer member from retaining engagement with said latch means.

30. In torque transmitting apparatus: driving and driven members; coengageable clutch elements on said members effecting a rotatable driving connection between said members, said elements comprising cam means responsive to the torque transmitted through said members to shift one of said members away from the other of said members to disengage said elements from each other; means exerting an axially directed force on said one member to urge said one member axially toward said other member and tend to maintain said elements coengaged; latch means rotatable by and engageable with said one member to hold said one member away from said other member; a retainer member engageable with said latch means to retain said latch means in holding engagement with said one member; an axially movable second driven member; means including a clutch for effecting a rotatable connection between said driven member and second driven member; means shiftable by said second driven member in moving axially away from said driven member to disengage said clutch for shifting said retainer member from retaining engagement with said latch means; and spring means for axially moving said second driven member to clutch disengaging position.

31. In torque transmitting apparatus: driving and driven members; coengageable axially extending clutch elements on said members effecting a rotatable driving connection between said members and responsive to the torque being transmitted to shift said members axially with respect to each other and release said clutch elements from one another to disrupt such driving connection; latch means rotatable by and engageable with one of said members for holding said elements released from one another; and driving means rotatable by said driven member and movable with respect to said driven member in a direction axially away from said driving member to withdraw said latch means from its holding position.

References Cited in the file of this patent

UNITED STATES PATENTS

| | | |
|---|---|---|
| 1,678,634 | Chandler | July 31, 1928 |
| 1,708,213 | Chryst | Apr. 9, 1929 |
| 1,725,562 | Borchert | Aug. 20, 1929 |
| 1,913,046 | Callan | June 6, 1933 |
| 2,086,167 | Lamb | July 6, 1937 |
| 2,209,155 | Fagg | July 23, 1940 |
| 2,259,824 | Lowder | Oct. 21, 1941 |
| 2,299,956 | Stever | Oct. 27, 1942 |
| 2,436,947 | Vergne | Mar. 2, 1948 |
| 2,484,364 | Whitledge | Oct. 11, 1949 |
| 2,491,531 | Sturtevant | Dec. 20, 1949 |
| 2,497,893 | Linahan | Feb. 21, 1950 |